US010339319B2

(12) United States Patent
Kim et al.

(10) Patent No.: US 10,339,319 B2
(45) Date of Patent: Jul. 2, 2019

(54) METHOD AND APPARATUS FOR IDENTIFYING VULNERABILITY INFORMATION USING KEYWORD ANALYSIS FOR BANNER OF OPEN PORT

(71) Applicant: Korea Internet & Security Agency, Seoul (KR)

(72) Inventors: Hwan Kuk Kim, Seoul (KR); Tae Eun Kim, Seoul (KR); Dae Il Jang, Seoul (KR); Eun Hye Ko, Seoul (KR); Jee Soo Jurn, Seoul (KR); Sa rang Na, Seoul (KR); Eun Byul Lee, Seoul (KR)

(73) Assignee: KOREA INTERNET & SECURITY AGENCY, Seoul (KR)

( * ) Notice: Subject to any disclaimer, the term of this patent is extended or adjusted under 35 U.S.C. 154(b) by 204 days.

(21) Appl. No.: 15/345,396

(22) Filed: Nov. 7, 2016

(65) Prior Publication Data

US 2018/0129810 A1 May 10, 2018

(30) Foreign Application Priority Data

Nov. 4, 2016 (KR) .................. 10-2016-0146997

(51) Int. Cl.
*G06F 21/57* (2013.01)
*G06F 16/901* (2019.01)
*G06F 16/903* (2019.01)

(52) U.S. Cl.
CPC ........ *G06F 21/577* (2013.01); *G06F 16/9027* (2019.01); *G06F 16/90344* (2019.01); *G06F 2221/034* (2013.01)

(58) Field of Classification Search
CPC ............. G06F 21/577; G06F 17/30961; G06F 17/30985; G06F 16/90344
See application file for complete search history.

(56) References Cited

U.S. PATENT DOCUMENTS

2005/0154664 A1* 7/2005 Guy ...................... G06Q 40/00
705/35
2014/0189873 A1   7/2014 Elder et al.

FOREIGN PATENT DOCUMENTS

JP          2007-058514 A      3/2007

OTHER PUBLICATIONS

Genge et al., "ShoVAT: Shodan-based vulnerability assessment tool for internet-facing services", Security and Communication networks, May 2015 pp. 2696-2714 https://onlinelibrary.wiley.com/doi/abs/10.1002/sec.1262 (Year: 2015).*

* cited by examiner

*Primary Examiner* — Theodore C Parsons
*Assistant Examiner* — Carlos M De Jesus Lassala

(57) ABSTRACT

Provided are a method and an apparatus for identifying computer system information which process banner information of an open port of a computer system, create a CPE tree by analyzing a CPE dictionary, and search keywords of respective levels of the CPE tree in a banner and generate one or more CPEs based on the CPE tree observing a format of the CPE dictionary to select CPEs which most match information of an operating system or an application program of a specific computer system among various CPE candidates and rapidly and easily identify CPE type vulnerability information which can interlock with CVE vulnerability information.

18 Claims, 9 Drawing Sheets

METHOD AND APPARATUS FOR IDENTIFYING VULNERABILITY INFORMATION USING KEYWORD ANALYSIS FOR BANNER OF OPEN PORT

CROSS-REFERENCE TO RELATED APPLICATIONS

This application claims priority to and the benefit of Korean Patent Application No. 10-2016-0146997 filed in the Korean Intellectual Property Office on Nov. 4, 2016, the entire contents of which are incorporated herein by reference. Moreover, the present application claims priority due to the same reason with respect to countries other than U.S.A., the entire contents of which are incorporated herein by reference.

TECHNICAL FIELD

The present invention relates to a method and an apparatus for identifying vulnerability information by performing keyword analysis for a banner of an open port The present invention corresponds to a product of a research projected performed under with the support of the Ministry of Science, ICT, and Future Planning by a financial resource of a government (the Ministry of Science, ICT, and Future Planning) in 2016 (Project ID: 1711037880).

BACKGROUND ART

Contents described in this part just provide background information on the present exemplary embodiment and do not configure the prior art.

Security vulnerability included in software may be easily abused in attacking a computer system. Attackers may perform malicious actions by identifying web services having vulnerable security by means of Internet scan tools. Accordingly, security managers need to be able to well know opened vulnerabilities and rapidly cope with the vulnerabilities.

A National Vulnerability Database (NVD) provides common vulnerabilities and exposures (CVE) information so as to easily share known security vulnerability information. The CVE provides a method for referring to the security vulnerability information of a software package and is constituted by a vulnerability overview, a common vulnerability scoring system (CVSS), a vulnerability occurrence product name (common platform enumeration (CPE)), a vulnerability type (common weakness enumeration (CWE)), and the like.

In a method for generating the CPE information in the related art, since the CPE information is generated by searching for product information based on a pattern ("Integer.Integer.Integer") of a product version, there is a limit in analyzing various CPE candidates.

A method and an apparatus that provide information on a CPE type computer system for overcoming the limit and interlocking with CVE vulnerability information have not yet been implemented.

SUMMARY OF THE INVENTION

Inventors of the present invention intend to perform overall keyword analysis for banner information based on a CPE dictionary.

Exemplary embodiments of the present invention have been made in an effort to process banner information of an open port of a computer system, create a CPE tree by analyzing a CPE dictionary, and search keywords of respective levels of the CPE tree in a banner and generate a CPE based on the CPE tree observing a format of the CPE dictionary to select CPEs which most match information of an operating system or an application program of a specific computer system among various CPE candidates and rapidly and easily identify CPE type vulnerability information which can interlock with CVE vulnerability information.

Other objects which are not specified in the present invention may be additionally considered within the scope to be easily deduced from a detailed description and an effect thereof.

An exemplary embodiment of the present invention provides a method for identifying information of a computer system by a computing device, including: acquiring service information which operates in a specific port of the computer system connected to a network; processing the acquired service information; acquiring a vulnerability occurrence product name (common platform enumeration (CPE) dictionary through the network; creating a CPE tree having a plurality of levels and a plurality of nodes by analyzing the CPE dictionary; searching keywords of respective levels of the CPE tree in the processed service information; and combining the keywords included in the processed service information among the keywords of the CPE tree to generate one or more CPEs based on the CPE tree that observe the format of the CPE dictionary and output the CPEs.

Another exemplary embodiment of the present invention provides an apparatus for identifying computer system information, including: a service information acquiring unit acquiring service information which operates in a specific port of a computer system connected to a network; a service information processing unit processing service information keywords from the service information; a CPE dictionary acquiring unit acquiring a vulnerability occurrence product name (common platform enumeration (CPE) dictionary through the network; a CPE tree creating unit creating a CPE tree having a plurality of levels and a plurality of nodes by analyzing the CPE dictionary; a CPE tree searching unit searching keywords of respective levels of the CPE tree in the processed service information; and a CPE generating unit combining the keywords included in the processed service information among the keywords of the CPE tree to generate one or more CPEs based on the CPE tree that observe the format of the CPE dictionary and output the CPEs.

Yet another exemplary embodiment of the present invention provides a computer program for identifying information of a computer system, which is recorded in a non-transitory computer readable medium including computer program commands executed by a processor, in which when the computer program commands are executed by a processor of a computing device, the computer program performs operations including: acquiring service information which operates in a specific port of the computer system connected to a network; processing the acquired service information; acquiring a vulnerability occurrence product name (common platform enumeration (CPE) dictionary through the network; creating a CPE tree having a plurality of levels and a plurality of nodes by analyzing the CPE dictionary; searching keywords of respective levels of the CPE tree in the processed service information; and combining the keywords included in the processed service information among the keywords of the CPE tree to generate one or more CPEs based on the CPE tree that observe the format of the CPE dictionary and output the CPEs.

As described above, according to exemplary embodiments of the present invention, banner information of an open port of a computer system is processed, a CPE tree is created by analyzing a CPE dictionary, and keywords of respective levels of the CPE tree are searched in a banner and one or more CPEs is generated based on the CPE tree observing a format of the CPE dictionary to select CPEs which most match information of an operating system or an application program of a specific computer system among various CPE candidates and rapidly and easily identify CPE type vulnerability information which can interlock with CVE vulnerability information.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 9 is a flowchart illustrating a method for identifying computer system information according to another exemplary embodiment of the present invention. It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, exemplary embodiments of the present invention will be described in detail with reference to the accompanying drawings.

Hereinafter, in describing the present invention, a detailed explanation of known technologies associated with the present invention, which is apparent to those skilled in the art may be omitted to avoid unnecessarily obscuring the subject matter of the present invention and some exemplary embodiments of the present invention will be described in detail through illustrative drawings.

Figure 1:
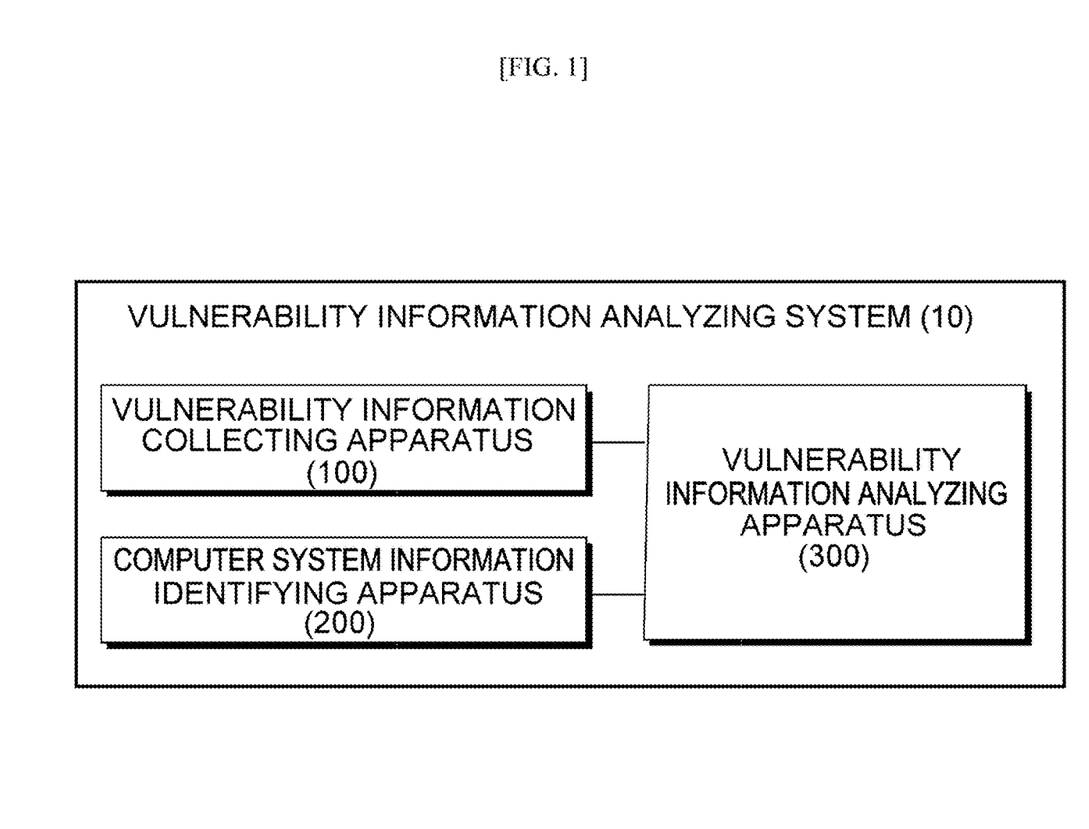
FIG. 1 is a block diagram illustrating a vulnerability information analyzing system according to exemplary embodiments of the present invention.

FIG. 1 is a block diagram illustrating a vulnerability information analyzing system according to exemplary embodiments of the present invention. As illustrated in FIG. 1, the vulnerability information analyzing system 10 includes a vulnerability information collecting apparatus 100, a computer system information identifying apparatus 200, and a vulnerability information analyzing apparatus 300. The vulnerability information analyzing system 10 may not include some components among various components exemplarily illustrated in FIG. 1 or additionally include other components.

The vulnerability information analyzing system 10 is a system that checks security vulnerability information on a computer system and a network. The vulnerability information analyzing system 10 performs operations of collecting and analyzing, and sharing vulnerability information.

The vulnerability information collecting apparatus 100 is an apparatus that collects the vulnerability information. Vulnerabilities represent a risk which may permit an illegal access of a user to the computer system, a threat to interrupt a normal service of the computer system, a risk for leakage, falsification, and deletion of primary data managed by the computer system, and the like. In detail, the vulnerabilities include (i) system security vulnerabilities including a race condition, environmental variables, accounts and passwords, an access authority, a system configuration, a network configuration, a buffer overflow, a back door, and the like, (ii) network security vulnerabilities including providing unnecessary service and information, a service denial attack, RPC, HTTP, SMTP, FTP, BIND, FINGER, the buffer overflow, and the like, and iii) application program vulnerabilities including a web server, a firewall server, an IDS server, a database server, a source code vulnerability, and the like.

The computer system information identifying apparatus 200 is an apparatus that serves to identify use information of an operating system and/or an application of a specific computer system. Type and contents of various and vast vulnerability information collected by the vulnerability information collecting apparatus 100 vary depending on the operating system or an application program. The computer system information identifying apparatus 200 clearly identifies the use information for the operating system or application program so as for the vulnerability information analyzing apparatus 300 to check and appropriately cope with the vulnerabilities.

The vulnerability information analyzing apparatus 300 is an apparatus that analyzes and shares the vulnerability information. A database is built up by integrating various vulnerability information received from the vulnerability information collecting apparatus 100 and the use information for the specific computer system received from the computer system information identifying apparatus 200.

Figure 2:
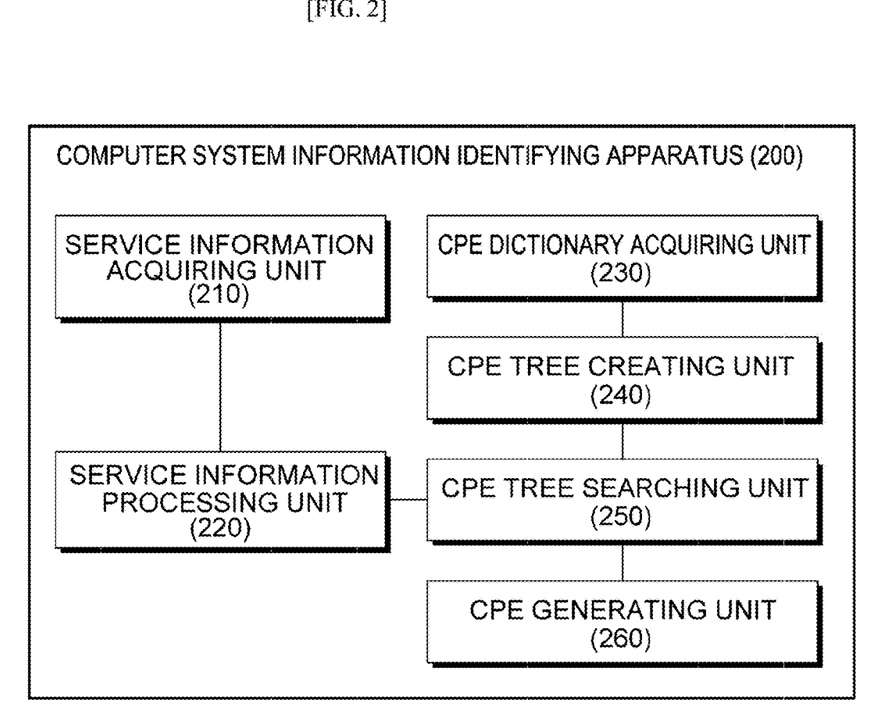
FIG. 2 is a block diagram illustrating an apparatus for identifying computer system information according to an exemplary embodiment of the present invention.

FIG. 2 is a block diagram illustrating a computer system information identifying apparatus according to an exemplary embodiment of the present invention. As illustrated in FIG. 2, the computer system information identifying apparatus 200 includes a service information acquiring unit 210, a service information processing unit 220, a CPE dictionary acquiring unit 230, a CPE tree creating unit 240, a CPE tree searching unit 250, and a CPE generating unit 260. The computer system information identifying apparatus 200 may not include some components among various components exemplarily illustrated in FIG. 2 or additionally include other components.

The service information acquiring unit 210 acquires service information which operates at a specific port of the computer system connected to a network. The service information acquiring unit 210 may acquire a character string included in a banner of an open port among specific ports of the computer system. Each communication protocol has a unique port. The service information acquiring unit 210 may find a service provided by the computer system by a port scan, that is, searching an opened port in the computer system. Representatively, as the port, a TCP/UDP port is provided and the open port may be verified by executing various commands. The banner serves as a notice shown when attempting to access the computer system. The service information acquiring unit 210 may verify a version or kernel version of the operating system by using information included in the banner.

The service information processing unit 220 processes the service information for keyword searching. The service information processing unit 220 converts the character string of the acquired banner information into lower cases. The service information processing unit 220 may remove meaningless characters in a relationship with product information. The meaningless characters in the relationship with product information are previously set. The meaningless characters may be characters estimated based on various product information or statistically calculated characters. In a step in which the service information processing unit 220 repeatedly performs a function to process the service information, the characters may be updated and changed.

The CPE dictionary acquiring unit 230 acquires a vulnerability occurrence product name (common platform enumeration (CPE) dictionary. The CPE is constituted by 7 fields in a URL mode and has a format such as "cpe:/part:vendor:product:version:update:~edition~sw_edition~target_sw~target_hw~other:language". For example, "Microsoft Internet Explorer 8.0.6001 Beta" is configured like "cpe:/a:microsoft:internet_explorer:8.0.6001:beta".

In a CPE format, part is divided into 'a' meaning an application, 'o' meaning the OS, and 'h' meaning hardware. In the CPE format, 'sw_edition' means an edition such as online, special, and the like, 'target_sw' means an operating system to be installed, and 'target_hw' means hardware to be installed.

The CPE dictionary acquiring unit 230 may acquire the CPE dictionary from the database providing the CPE dictionary through the network.

Figure 3:
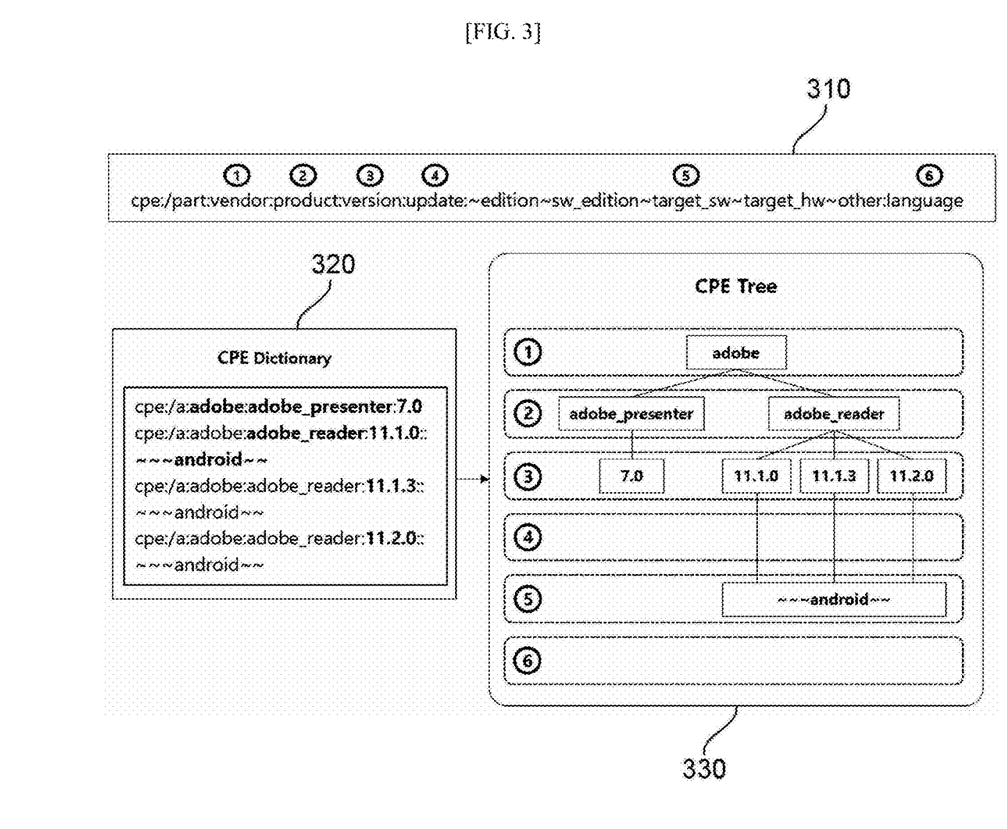
FIG. 3 is a diagram illustrating that a CPE tree is created according to exemplary embodiments of the present invention.

FIG. 3 is a diagram illustrating that a CPE tree is created according to exemplary embodiments of the present invention. Referring to FIG. 3, an operation of the computer system information identifying apparatus 200 that creates the CPE tree will be described.

The CPE tree creating unit 240 analyzes a CPE dictionary 320 to create a CPE tree 330 having a plurality of levels and a plurality of nodes.

The CPE tree may have a total of 6 levels. 6 levels of the CPE tree correspond to vendor to language except for part, respectively in a CPE format 310.

Referring to FIG. 3, in the CPE tree 330 having the plurality of levels and the plurality of nodes, i) a node corresponding to a first level includes vendor information, ii) a node corresponding to a second level includes product name information, a node corresponding to a third level includes product version information, a node corresponding to a fourth level includes update information, a node corresponding to a fifth level includes edition information, and a node corresponding to a sixth level includes product language information.

The created CPE tree may include at least three levels among the first to sixth levels. The information included in the node corresponding to the first level and the information included in the node corresponding to the second level may be the same as each other. That is, a vendor and a product name may be the same as each other.

The CPE tree includes at least one of a parent node, a child node, and a sibling node. The parent node and the child node are connected to each other. A node corresponding to a higher level among the plurality of levels corresponds to the parent node, a node corresponding to a lower level among the plurality of levels corresponds to the child node, and nodes corresponding to the same level among the plurality of levels correspond to the sibling node.

When an intermediate level is omitted among the plurality of levels, the node corresponding to the higher level node of the omitted intermediate level and the node corresponding to the lower level of the omitted intermediate level are connected to each other.

The CPE tree creating unit 240 creates the plurality of levels by separating the character string of the CPE dictionary based on a character ':'. The CPE tree creating unit 240 separates the character string based on a character '~' at the fifth level of the CPE dictionary.

The CPE tree creating unit 240 may separate the character string based on a character '_' at each level of the CPE dictionary. For example, in the case of "cpe:/a:microsoft:ftp_service:7.0", the first level is 'microsoft', the second level is 'ftp' and 'service', the third level is configured by '7.0' and the fourth to sixth levels for the corresponding CPE do not exist.

Figure 4:
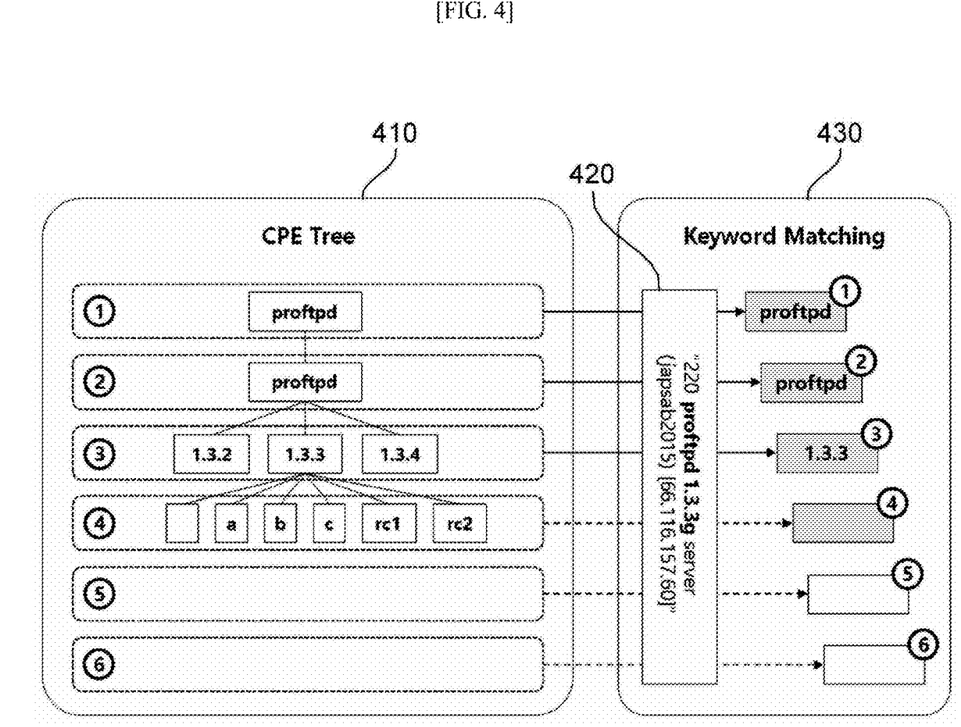
FIGS. 4 and 5 are diagrams illustrating that keywords are searched and matched based on a CPE tree according to exemplary embodiments of the present invention.
Figure 5:
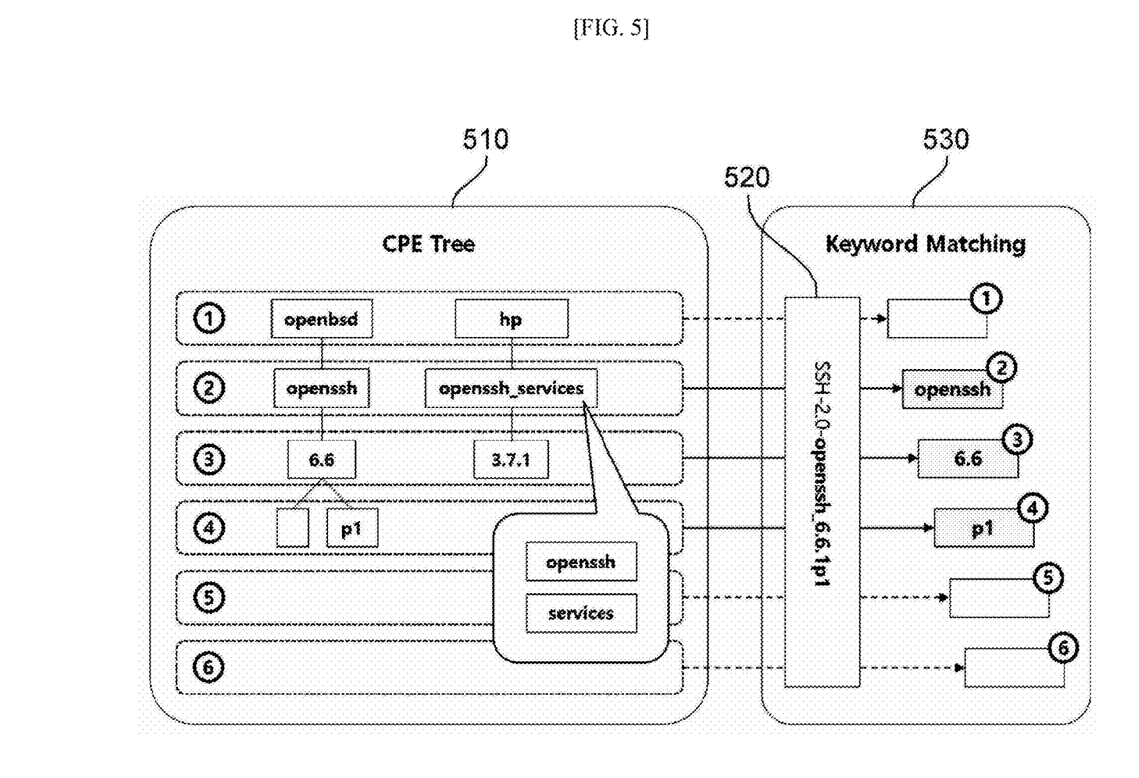

FIGS. 4 and 5 are diagrams illustrating that keywords are searched and matched based on a CPE tree according to exemplary embodiments of the present invention. Referring to FIGS. 4 and 5, an operation of the computer system information identifying apparatus 200 that searches the CPE tree will be described.

The CPE tree searching unit 250 performs an operation of searching service information keywords in the CPE tree.

The CPE tree searching unit 250 compares and searches i) keywords included in the first level or the second level of the CPE tree and ii) the processed service information in the entirety of the CPE tree. That is, the CPE tree searching unit 250 searches the keyword included in the first level or the second level of the CPE tree in the banner. As illustrated in FIG. 4, the CPE tree searching unit 250 searches 'proftpd' which is the keyword at the first level and the second level of the CPE tree in "220 ProFTPD 1.3.3g Server (Japsab2015) [66.116.157.60]" which is banner information 420.

When the keywords included in the first level or the second level are searched in the processed service information, the CPE tree searching unit 250 searches for only child nodes of a tree including the keywords included in the first level or the second level. Referring to FIG. 4, when 'proftpd' of the nodes at the first level and the second level of a CPE tree 410 is searched in the banner 420, a keyword to be used for searching at the third level is constituted by '1.3.2', '1.3.3', and '1.3.4' which are the child nodes of 'proftpd'. Reference numeral 430 represents keywords corresponding to the first to third levels which are matched. Referring to FIG. 5, when 'openssh' which is the second level of a CPE tree 510 is searched in a banner 520, the keyword to be used for searching at the third level becomes '6.6'. In the case of the third level, the version information may be divided and searched. In the case of version '6.6.1', '6.6' may be searched by a sub character string.

When the character string to be searched includes one character, the CPE tree searching unit 250 searches the keyword only when a number or '_' exists in front of one character and a blank exists in the rear of the character string to be searched.

The CPE tree searching unit 250 compares the product name information by taking precedence over the vendor information when the vendor information and the product name information are the same as each other among the keywords included in the respective levels of the CPE tree.

Figure 6:
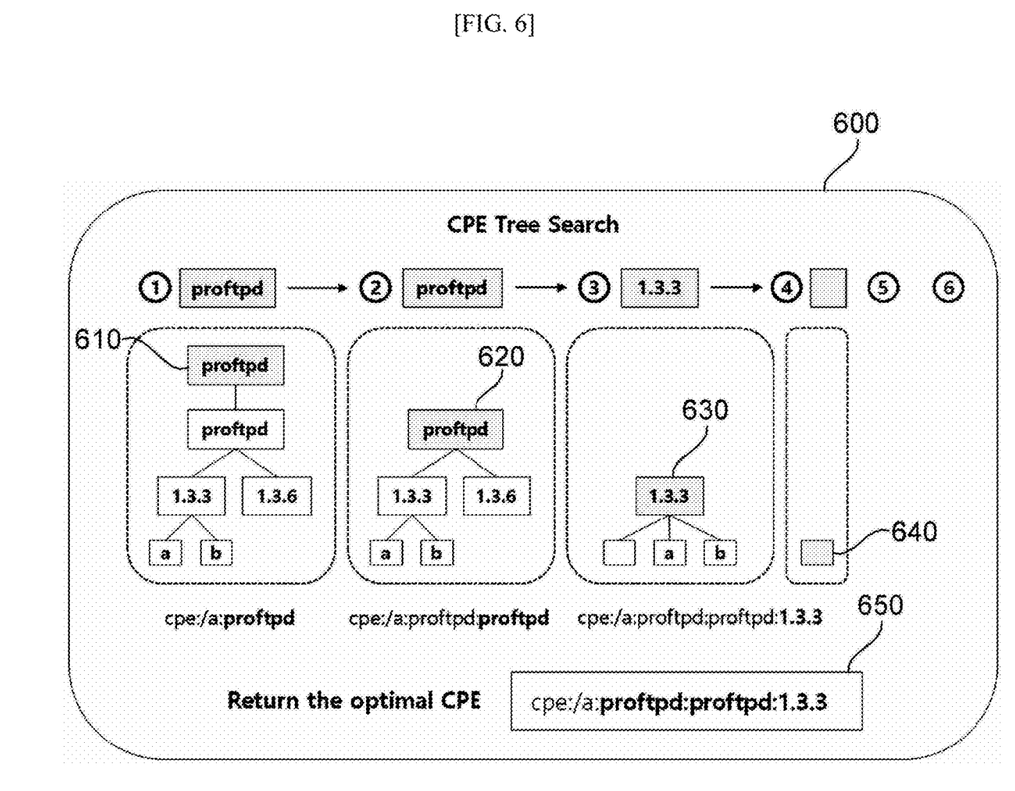
FIGS. 6 and 7 are diagrams illustrating that CPEs are generated based on the CPE tree according to exemplary embodiments of the present invention.
Figure 7:
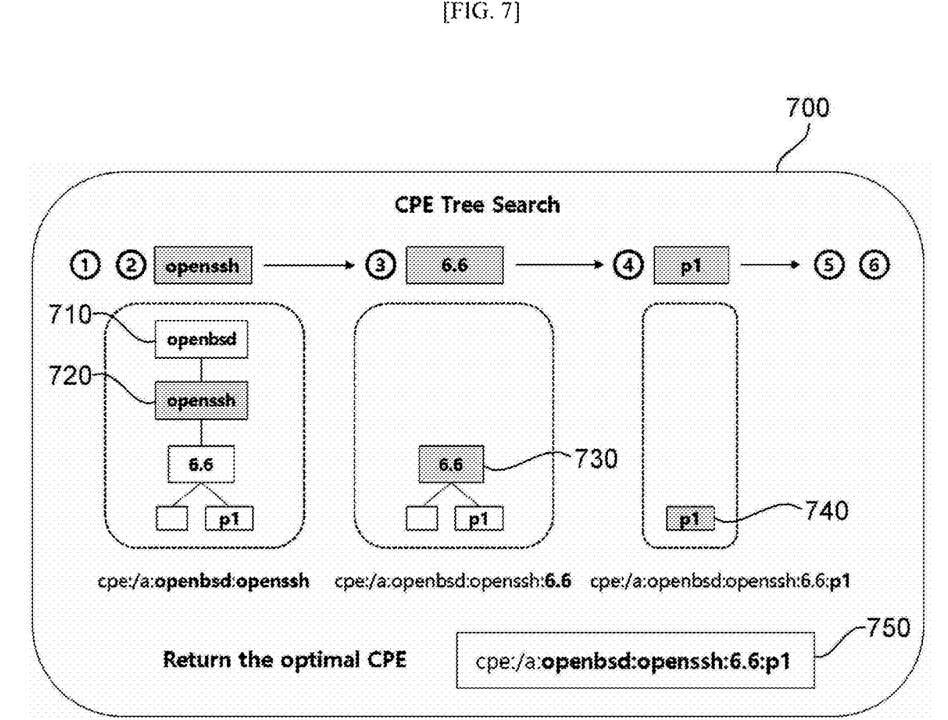
Figure 8:
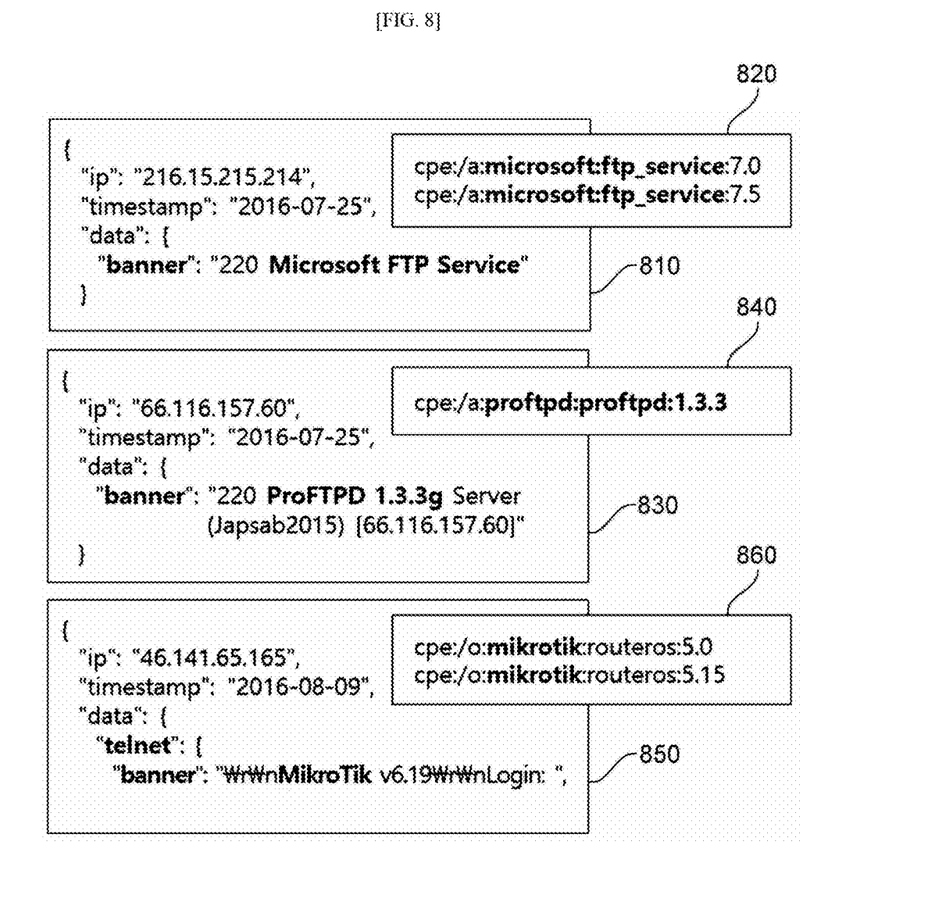
FIG. 8 is a diagram illustrating CPEs generated based on banner information according to exemplary embodiments of the present invention.

FIGS. 6 and 7 are diagrams illustrating that CPEs are generated based on the CPE tree according to exemplary embodiments of the present invention and FIG. 8 is a diagram illustrating CPEs generated based on banner information according to exemplary embodiments of the present invention. Referring to FIGS. 6 to 8, an operation of the computer system information identifying apparatus 200 that generate one or more CPEs based on the CPE tree will be described.

The CPE generating unit 260 combines the keywords included in the searched banner to generate one or more CPEs based on the CPE tree that observe the format of the CPE dictionary and output the CPEs.

Referring to FIG. 6, while the CPE tree searching unit 250 performs an operation (600) of searching the keywords included in the CPE tree in "ProFTPD 1.3.3g Server (Japsab2015) [66.116.157.60]" which is the banner information, the CPE generating unit 260 returns "cpe:/a:proftpd:proftpd:1.3.3" which is the optimized CPE 650 by combining 'proftpd' 610 at the first level, 'proftpd' 620 at the second level, '1.3.3' 630 at the third level, and a blank 640 at the fourth level.

Referring to FIG. 7, while the CPE tree searching unit 250 performs an operation (700) of searching the keywords included in the CPE tree in "SSH-2.0-openssh6.6.1p1" which is the banner information, the CPE generating unit 260 returns "cpe:/a:openbsd:openssh:6.6:p1" which is the optimized CPE 750 by combining 'openbsd' 710 at the first level, 'openssh' 720 at the second level, '6.6' 730 at the third level, and 'p1' 740 at the fourth level.

The CPE generating unit 260 outputs the CPE including a longest character string among character strings of service information keywords. The CPE generating unit 260 outputs the CPE including most service information keywords. For example, when the acquired banner information is "220 Microsoft FTP Service", the CPE generating unit 260 may create CPEs including at least one of 'microsoft', 'ftp', and 'service' keywords. The CPE generating unit 260 may return "cpe:/a:microsoft:ftp_service:7.0" including all of 'microsoft', 'ftp', and 'service' keywords among CPEs including "cpe:/a:cerberusftp:ftp_server:1.1", "cpe:/a:coreftp:core_ftp:1.2", "cpe:/a:deskshare:auto_ftp_manager:4.31", "cpe:/a:microsoft:ftp_service:7.0", and the like. Meanwhile, when another keyword other than the keyword used in the longest character string exists, the CPE may be additionally returned. That is, two or more generated CPEs may exist.

Referring to FIG. 8, the generated CPEs may be easily determined based on various banner information.

The computer system information identifying apparatus 200 outputs "cpe:/a:microsoft:ftp_service:7.0" and "cpe:/a:microsoft:ftp_service:7.5" 820 from the CPE tree by searching the keywords of the CPE tree in "220 Microsoft FTP Service" which is banner information 810.

The computer system information identifying apparatus 200 outputs "cpe:/a:proftpd:proftpd:1.3.3" 840 from the CPE tree by searching the keywords of the CPE tree in "220 ProFTPD 1.3.3g Server (Japsab2015) [66.116.157.60]" which is banner information 830.

The computer system information identifying apparatus 200 outputs "cpe:/o:mikrotik:routeros:5.0" and "cpe:/o:mikrotik:routeros:5.15" 860 from the CPE tree by searching the keywords of the CPE tree in "†r†n MikroTik v6.19†r†n Login:" which is banner information 850.

According to the exemplary embodiments, CPEs which most match information of the operating system or the application program of a specific computer system among various CPE candidates associated with the specific computer system may be selected based on the CPE tree and CPE type software information which may interlock with CVE vulnerability information may be rapidly and easily identified.

Components included in the computer system information identifying apparatus 200 are connected to a communication path connecting a software module or a hardware module in the apparatus to operate organically with each other. The components perform communication by using one or more communication bus or signal lines.

The computer system information identifying apparatus 200 may be implemented in a logic circuit by hardware, firmware, software, or a combination thereof and implemented by using a general or specific purpose computer. The apparatus may be implemented by using a hardwired device, a field programmable gate array (FPGA), an application specific integrated circuit (ASIC), and the like. Further, the apparatus may be implemented by a system on chip (SoC) including one or more processors and controllers.

The computer system information identifying apparatus 200 may be mounted on a computing device or server having a hardware element in the form of the software, the hardware, or the combination thereof. The computing device or server may mean various devices including all or some of communication devices including a communication mode for performing communication with various devices or wired/wireless communication networks, a memory for storing data for executing a program, a microprocessor for calculation and commanding by executing the program, and the like.

Figure 9:
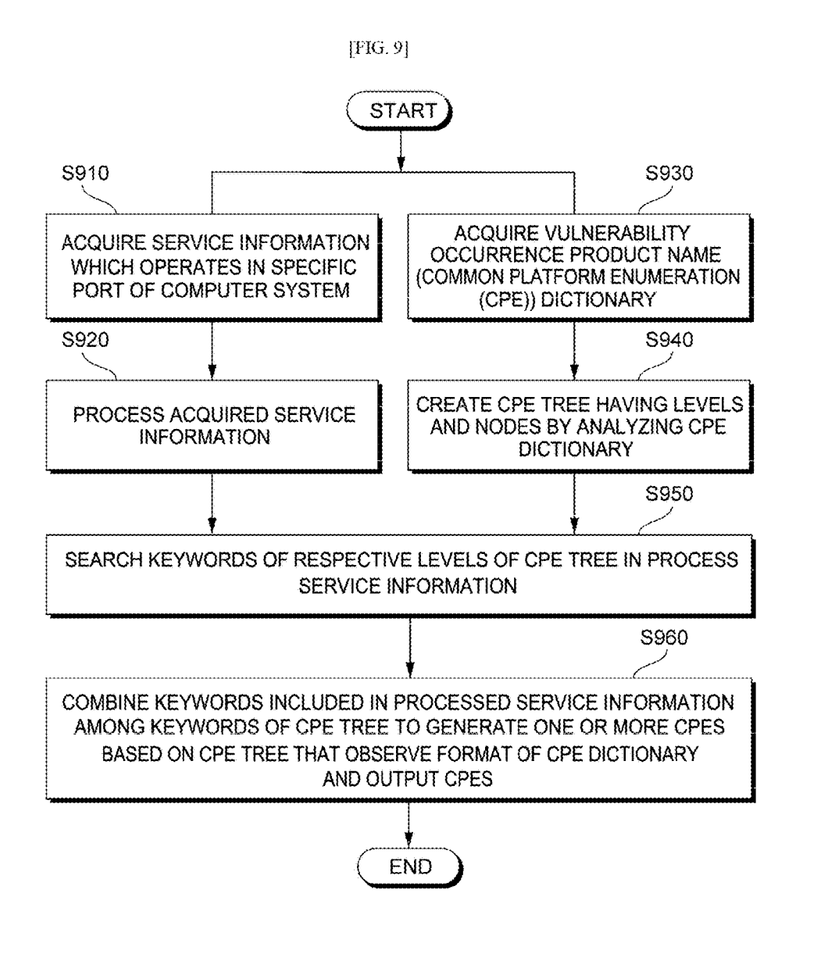

FIG. 9 is a flowchart illustrating a method for identifying computer system information according to another exemplary embodiment of the present invention. The computer system information identifying method may be performed by the computing device and operates by the same method as the computer system information identifying apparatus.

In step S910, the computing device acquires service information which operates in a specific port of the computer system connected to the network. In the acquiring of the service information (S910), the character string included in the banner of the open port among specific ports of the computer system may be acquired.

In step S920, the computing device processes the acquired service information. In the processing of the service information (S920), the acquired character string of the banner information is converted into the lower cases and meaningless characters are removed from the character string.

In step S930, the computing device acquires the vulnerability occurrence product name (common platform enumeration (CPE)) dictionary through the network.

In step S940, the computing device creates the CPE tree having the plurality of levels and the plurality of nodes by analyzing the CPE dictionary.

The CPE tree includes at least three levels among the first to sixth levels. The node corresponding to the first level includes the vendor information, the node corresponding to the second level includes the product name information, the node corresponding to the third level includes the product version information, the node corresponding to the fourth level includes the update information, the node corresponding to the fifth level includes the edition information, and the node corresponding to the sixth level includes the product language information.

In the CPE tree, the information included in the node corresponding to the first level and the information included in the node corresponding to the second level may be the same as each other. That is, the vendor and the product name may be the same as each other.

The CPE tree includes at least one of a parent node, a child node, and a sibling node. The parent node and the child node are connected to each other. A node corresponding to a higher level among the plurality of levels corresponds to the parent node, a node corresponding to a lower level among the plurality of levels corresponds to the child node, and nodes corresponding to the same level among the plurality of levels correspond to the sibling node.

When an intermediate level is omitted among the plurality of levels, the node corresponding to the higher level node of the omitted intermediate level and the node corresponding to the lower level of the omitted intermediate level are connected to each other.

In the creating of the CPE tree (S940), the plurality of levels is created by separating the character string of the CPE dictionary based on the character ':' and separating the character string based on the character '_' at each level and separating the character string based on the character '~' at the fifth level.

In step S950, the computing device searches the keywords at the respective levels of the CPE tree in the processed service information. In the searching of the keywords of the CPE tree in the service information (S950), keywords included in the first level and/or the second level of the CPE tree and ii) the processed service information are compared and searched.

In the searching of the service information keywords in the CPE tree (S950), when the keywords included in the first level or the second level are searched in the processed service information, at least one keyword of the third to sixth levels is searched only with respect to the child nodes of the tree including the keywords included in the first level or the second level.

In the searching of the service information keywords in the CPE tree (S950), when the character string to be searched includes one character, the keyword is searched only when a number or '_' exists in front of one character and a blank exists in the rear of the character string to be searched.

In the searching of the service information keywords in the CPE tree (S950), the product name information is compared by taking precedence over the vendor information when the vendor information and the product name information are the same as each other among the keywords included in the respective levels of the CPE tree.

In step S960, the computing device combines the keywords included in the processed service information among the keywords of the CPE tree to generate one or more CPEs based on the CPE tree that observe the format of the CPE dictionary and output the CPEs. In outputting one or more CPEs (S960), the CPE including a longest character string is output among character strings of service information keywords. In the outputting of one or more CPEs (S960), the CPE including most service information keywords is output.

According to the exemplary embodiments, CPEs which most match the information of the operating system or the application program of a specific computer system among various CPE candidates associated with the specific computer system may be selected based on the CPE tree and CPE type vulnerability information which may interlock with CVE vulnerability information may be rapidly and easily identified.

In FIG. 9, it is disclosed that the respective steps are sequentially executed, but this just exemplarily describes the steps and those skilled in the art will be able to make various modifications and transformations and apply the modifications and transformations by executing the steps by changing an order disclosed in FIG. 9, executing one or more steps in parallel, or adding other steps without departing from an essential characteristic of the exemplary embodiment of the present invention.

Meanwhile, the embodiments according to the present invention may be implemented in the form of program instructions that can be executed by computers, and may be recorded in computer readable media. The computer readable media may include program instructions, a data file, a data structure, or a combination thereof. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A method for identifying information of a computer system by a computing device, the method comprising:
   acquiring, by the computing device, service information which operates in a specific port of the computer system connected to a network;
   processing, by the computing device, the acquired service information;
   acquiring, by the computing device, a vulnerability occurrence product name common platform enumeration (CPE) dictionary through the network;
   creating, by the computing device, a CPE tree having a plurality of levels including at least three levels and a plurality of nodes by analyzing the CPE dictionary,
      wherein a node corresponding to a first level includes vendor information, a node corresponding to a second level includes product name information, a node corresponding to a third level includes product version information, a node corresponding to a fourth level includes update information, a node corresponding to a fifth level includes edition information, and a node corresponding to a sixth level includes product language information, and
      wherein the CPE dictionary includes a character string used to create the CPE tree, and the character string corresponds to at least (i) a respective first node of the CPE tree corresponding to the first level or the second level, (ii) a respective second node of the CPE tree having the respective first node as a parent node, and (iii) a respective third node of the CPE tree having the respective second node as a parent node;
   searching, by the computing device, keywords of respective levels of the CPE tree in the processed service information; and
   combining, by the computing device, the keywords included in the processed service information among the keywords of the CPE tree to generate one or more CPEs based on the CPE tree that observe the format of the CPE dictionary and output the CPEs, in order to generate the CPEs from the acquired service information more rapidly and easily when the acquired service information does not conform to a predetermined pattern.

2. The method of claim 1, wherein in the acquiring of the service information, a character string included in a banner of an open port among specific ports of the computer system is acquired.

3. The method of claim 2, wherein in the processing of the acquired service information, the acquired character string of the banner information is converted into lower cases and meaningless characters are removed in a relationship with product information.

4. The method of claim 1, wherein in the CPE tree having the plurality of levels and the plurality of nodes, information included in the node corresponding to the first level and information included in the node corresponding to the second level are the same as each other.

5. The method of claim 1, wherein the CPE tree having the plurality of levels and the plurality of nodes includes at least one of a parent node, a child node, and a sibling node, the parent node and the child node are connected to each other, a node corresponding to a higher level among the plurality of levels is the parent node, a node corresponding to a lower level the plurality of levels is the child node, and nodes corresponding to the same level among the plurality of levels are the sibling node, and
   when an intermediate level is omitted among the plurality of levels, the node corresponding to the higher level node of the omitted intermediate level and the node corresponding to the lower level of the omitted intermediate level are connected to each other.

6. The method of claim 1, wherein in the creating of the CPE tree, the plurality of levels is created by separating the character string of the CPE dictionary based on the character ':' and separating the character string based on the character '_' at each level and separating the character string based on the character '~' at the fifth level.

7. The method of claim 1, wherein in the searching of the processed service information keywords in the CPE tree, (i) the keywords included in the first level or the second level of the CPE tree and ii) the processed service information are compared and searched.

8. The method of claim 7, wherein in the searching of the processed service information keywords in the CPE tree, when the keywords included in the first level or the second level are searched in the processed service information, only child nodes of a tree including the keywords included in the first level or the second level are searched.

9. The method of claim 1, wherein in the searching of the processed service information keywords in the CPE tree, when the character string to be searched includes one character, the keyword is searched only when a number or '_' exists in front of one character and a blank exists in the rear of the character string to be searched.

10. The method of claim 1, wherein when the vendor information and the product name information are the same as each other among the keywords included in the respective levels of the CPE tree, the product name information is compared by taking preference over the vendor information.

11. The method of claim 1, wherein in the outputting of the one or more CPEs, a CPE including the longest character string among character strings of the processed service information keywords is output.

12. The method of claim 1, wherein in the outputting of the one or more CPEs, a CPE including most service information keywords is output.

13. An apparatus for identifying computer system information, the apparatus comprising:
   a service information acquiring unit acquiring service information which operates in a specific port of a computer system connected to a network;
   a service information processing unit processing service information keywords from the service information;
   a CPE dictionary acquiring unit acquiring a vulnerability occurrence product name common platform enumeration (CPE) dictionary through the network;
   a CPE tree creating unit creating a CPE tree having a plurality of levels and a plurality of nodes by analyzing the CPE dictionary, wherein the CPE dictionary includes a character string used to create the CPE tree, and the character string corresponds to at least (i) a respective first node of the CPE tree corresponding to vendor information or product name information, (ii) a respective second node of the CPE tree having the respective first node as a parent node, and (iii) a respective third node of the CPE tree having the respective second node as a parent node;
   a CPE tree searching unit searching keywords of respective levels of the CPE tree in the processed service information, wherein the CPE tree searching unit:

compares and searches (i) the keywords included in the first level or the second level of the CPE tree and (ii) the processed service information, and searches only child nodes of a tree including the keywords included in the first level or the second level when the keywords included in the first level or the second level are searched in the processed service information; and a CPE generating unit combining the keywords included in the processed service information among the keywords of the CPE tree to generate one or more CPEs based on the CPE tree that observe the format of the CPE dictionary and output the CPEs, in order to generate the CPEs from the acquired service information more rapidly and easily when the acquired service information does not conform to a predetermined pattern.

14. The apparatus of claim 13, wherein the service information acquiring unit acquires a character string included in a banner of an open port among specific ports of the computer system.

15. The apparatus of claim 13, wherein the CPE tree creating unit creates the plurality of levels by separating the character string of the CPE dictionary based on the character ':' and separating the character string based on the character '_' at each level and separating the character string based on the character '~' at the fifth level.

16. The apparatus of claim 13, wherein the CPE tree searching unit compares the product name information by taking preference over the vendor information when the vendor information and the product name information are the same as each other among the keywords included in the respective levels of the CPE tree.

17. The apparatus of claim 13, wherein the CPE generating unit outputs a CPE including the longest character string among character strings of the service information keywords.

18. A computer program for identifying information of a computer system, which is recorded in a non-transitory computer readable medium including computer program commands executed by a processor, wherein when the computer program commands are executed by a processor of a computing device, the computer program performs operations including:

acquiring, by the computing device, service information which operates in a specific port of the computer system connected to a network;

processing, by the computing device, the acquired service information;

acquiring, by the computing device, a vulnerability occurrence product name common platform enumeration (CPE) dictionary through the network;

creating, by the computing device, a CPE tree having a plurality of levels and a plurality of nodes by analyzing the CPE dictionary, the plurality of levels including at least three levels of first to sixth levels, wherein a node corresponding to the first level includes vendor information, a node corresponding to the second level includes product name information, a node corresponding to the third level includes product version information, a node corresponding to the fourth level includes update information, a node corresponding to the fifth level includes edition information, and a node corresponding to the sixth level includes product language information, and wherein the CPE dictionary includes a character string used to create the CPE tree, and the character string corresponds to at least (i) a respective first node of the CPE tree corresponding to the first level or the second level, (ii) a respective second node of the CPE tree having the respective first node as a parent node, and (iii) a respective third node of the CPE tree having the respective second node as a parent node;

searching, by the computing device, keywords of respective levels of the CPE tree in the processed service information; and combining, by the computing device, the keywords included in the processed service information among the keywords of the CPE tree to generate one or more CPEs based on the CPE tree that observe the format of the CPE dictionary and output the CPEs, in order to generate the CPEs from the acquired service information more rapidly and easily when the acquired service information does not conform to a predetermined pattern.

* * * * *